United States Patent

Zicker

[11] Patent Number: 5,465,388
[45] Date of Patent: Nov. 7, 1995

[54] EMERGENCY CELLULAR RADIOTELEPHONE AND METHOD THEREFOR

[76] Inventor: Robert G. Zicker, 2930 Ascot La., Roswell, Ga. 30076

[21] Appl. No.: 20,308

[22] Filed: Feb. 19, 1993

[51] Int. Cl.[6] .................................... H04Q 7/20
[52] U.S. Cl. ...................... 455/33.1; 455/54.1; 455/56.1; 455/58.1; 379/59
[58] Field of Search ................... 455/33.1, 33.4, 455/54.1, 56.1, 67.1, 33.3, 58.1; 379/59, 58

[56] References Cited

U.S. PATENT DOCUMENTS

| | | | |
|---|---|---|---|
| 3,906,166 | 9/1975 | Cooper et al. | 455/56.1 |
| 4,176,254 | 11/1979 | Tuttle et al. | 179/5 |
| 4,724,538 | 2/1988 | Farrell | 379/59 |
| 4,742,560 | 5/1988 | Arai | 455/33 |
| 4,788,711 | 11/1988 | Nasco, Jr. | 379/59 |
| 4,860,341 | 8/1989 | D'Avello et al. | 379/91 |
| 4,903,320 | 2/1990 | Hanawa | 455/33.1 |
| 4,916,728 | 4/1990 | Blair | 379/59 |
| 5,020,091 | 5/1991 | Krolopp et al. | 379/58 |
| 5,159,625 | 10/1992 | Zicker | 379/59 |
| 5,228,074 | 7/1993 | Mizikovsky | 379/59 |
| 5,301,359 | 4/1994 | Van den Heuvel et al. | 455/54.1 |

FOREIGN PATENT DOCUMENTS 0179938  8/1991  Japan .................................. 455/58.1

Primary Examiner—Reinhard J. Eisenzopf
Assistant Examiner—Thanh Le
Attorney, Agent, or Firm—Lowell W. Gresham; Jordan M. Meschkow

[57] ABSTRACT

An emergency portable cellular radiotelephone (10) communicates with the one of A and B cellular systems that offers the best signalling. The radiotelephone may be energized from an internal battery (50) or an external power source (62). A single switch (38) is used to instigate emergency communication services. When a signalling channel is available and the switch (38) is activated, the radiotelephone (10) requests the placement of a call to a "911" phone number. Once the call is established, it may not be terminated at the radiotelephone (10), other than by removing power.

22 Claims, 5 Drawing Sheets

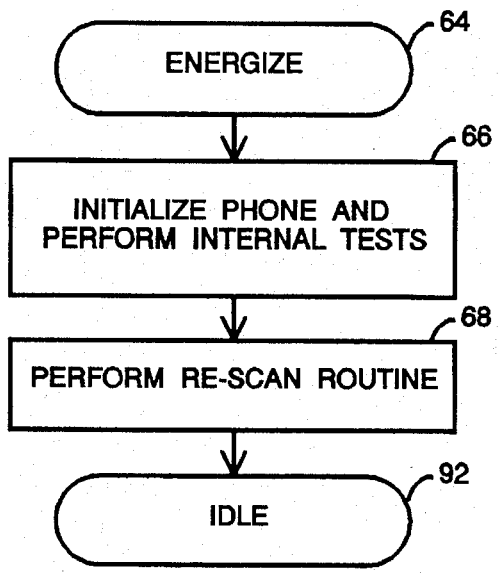
FIG. 3
| SCAN TABLE |||
|---|---|---|
| CHAN. NO. | SYSTEM | TUNING PARAMETERS |
| 313 | A | -- |
| 314 | A | -- |
| ⋮ | ⋮ | ⋮ |
| 333 | A | -- |
| 334 | B | -- |
| 335 | B | -- |
| ⋮ | ⋮ | ⋮ |
| 354 | B | -- |
FIG. 5
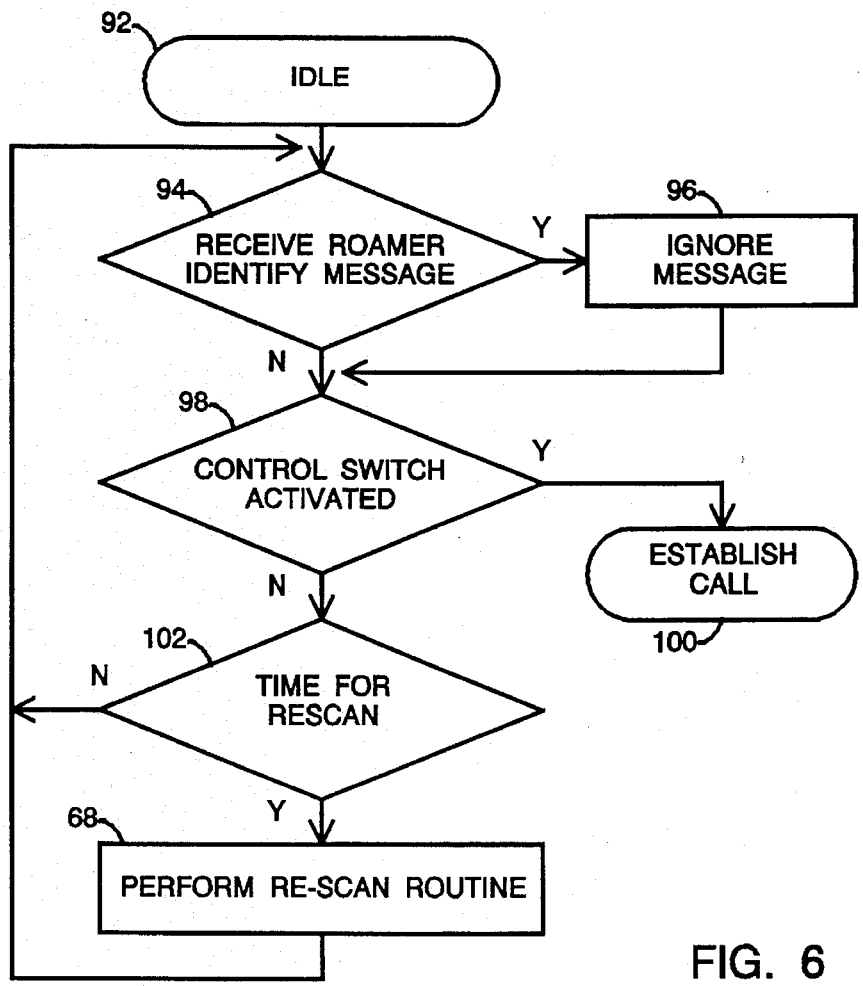
FIG. 6

EMERGENCY CELLULAR RADIOTELEPHONE AND METHOD THEREFOR

TECHNICAL FIELD OF THE INVENTION

The present invention relates generally to cellular radiotelephones. More specifically, the present invention relates to cellular radiotelephones that are specifically adapted for use in emergencies.

BACKGROUND OF THE INVENTION

Cellular radiotelephones have become increasingly popular for many different reasons, including their potential availability in case of emergency. However, conventional cellular phones fail to adequately meet emergency communication service needs because they are designed to achieve goals other than providing emergency communication services.

Emergency communication services differ from normal communication services. Emergency communication services are seldom needed, but when they are needed it is desirable that they be highly reliable and dependable. In emergency situations time is a critical factor, and emergency communication services desirably allow communication to commence with only a minimal delay. Moreover, emergency situations often are accompanied by extreme stress or panic on the part of callers, and very little mental or physical effort on the part of a caller is desirable in obtaining emergency communication services.

Stationary emergency telephones, some of which may be cellular radiotelephones, are known. However, such stationary emergency telephones are highly unsatisfactory because, in all likelihood, such an emergency phone is nowhere nearby when an emergency situation arises. Mobile radiotelephones installed in users' vehicles do a better job of providing emergency communication services than stationary telephones because they are capable of providing communication services in response to emergencies connected with vehicles and road travel. However, mobile radiotelephones are undesirably expensive for a large percentage of the population due to equipment costs, installation costs, and monthly service fees. Moreover, many emergency situations related to crime and health conditions do not occur near vehicles. Portable radiotelephones better meet the needs of emergency situations because they may be carried with a user to be readily available whenever and wherever needed.

However, even conventional portable cellular radiotelephones fail to adequately meet the needs of emergency communication services. Portable cellular radiotelephones are undesirably expensive for a large percentage of the population due to equipment costs and monthly service fees.

By FCC rule, cellular communication services are provided to a service area by up to two cellular systems, referred to as "A" and "B" systems. The majority of the population resides in service areas having both an A system and a B system. Conventional cellular radiotelephones, including portable cellular radiotelephones, are biased to favor operation on either A or B systems. In particular, conventional cellular radiotelephones are configured to operate in several different modes. Conventional cellular radiotelephones may operate only on a home system, only on A systems, only on B systems, preferably on A systems but on a B system if an A system is not available, or preferably on B systems, but on an A system if a B system is not available. None of these conventional modes of operating a cellular radiotelephone allows operation on the system with which communications are most likely to be the best. While these modes of operating cellular radiotelephones are adequate for normal communications, they are unacceptable for emergency communications because each one can lead to less reliable communication services.

Moreover, conventional portable cellular radiotelephones are intended for use in engaging in an indefinite number of calls. Accordingly, the power with which they transmit is limited to around 600 mw effective radiated power (ERP). This low power is deemed necessary to conserve battery reserves and to refrain from imposing a health hazard to the user from prolonged use. Unfortunately, this low power often leads to poor quality communication services. Often, a portable cellular radiotelephone will decide that a preferred system is available for use based upon the strength of a received signalling channel, but the portable cellular radiotelephone's transmitted signal is too weak to be received by the system. Consequently, communication services fail altogether.

Furthermore, conventional cellular radiotelephones, whether portable or not, are intended for making outgoing calls to any number of telephone numbers. Users must power-on their cellular phone, learn or know numbers to dial, discriminate keys on the radiotelephone and accurately dial the numbers, discriminate a send key from other keys and send the dialled numbers, and the like, before a system can commence setting up the call. In the stress and panic of many emergency situations this high level of user involvement is undesirable because of the likelihood of mistake and resulting time lost.

SUMMARY OF THE INVENTION

Accordingly, it is an advantage of the present invention that an improved emergency cellular radiotelephone is provided.

Another advantage of the present invention is that an emergency cellular radiotelephone is provided which uses the best available cellular system without a bias toward favoring an A cellular system or a B cellular system.

Another advantage of the present invention is that an emergency cellular radiotelephone is provided in a portable form with a higher transmission power level than is used by conventional portable cellular radiotelephones.

Another advantage of the present invention is that an emergency cellular radiotelephone is provided which may be quickly and easily operated to engage emergency communication services.

Another advantage of the present invention is that an emergency cellular radiotelephone is provided which may be manufactured and provided to the general population at less expense than conventional cellular radiotelephones.

The above and other advantages of the present invention are carried out in one form by a method of operating an emergency cellular radiotelephone in cooperation with A and B cellular systems. The A and B systems each have a plurality of signalling channels assigned thereto. The method calls for monitoring signalling channels assigned to the system A. Signalling channels assigned to the system B are also monitored. After this monitoring, the one of the system A and system B signalling channels which has a signal with the greatest signal strength is identified. The radiotelephone then communicates with the one of the A and B systems that has the identified one of the channels assigned thereto.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a flow chart of an Energize procedure performed by the radiotelephone;

FIG. 5 shows a block diagram of a scan table that may be used by the radiotelephone;

FIG. 6 shows a flow chart of an Idle procedure performed by the radiotelephone;

DETAILED DESCRIPTION OF THE PREFERRED EMBODIMENTS

Figure 1:
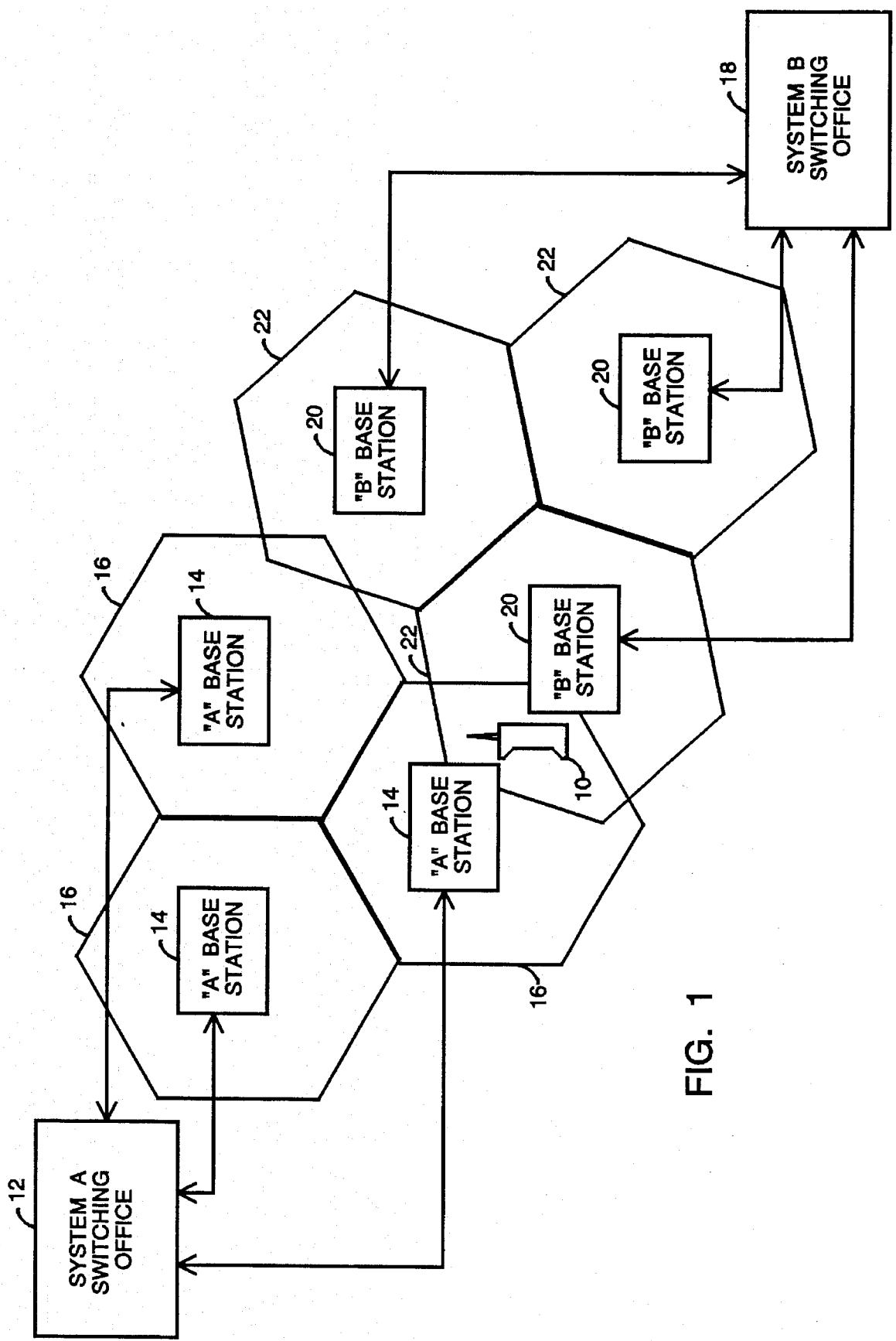
FIG. 1 shows a layout diagram of an environment within which an emergency cellular radiotelephone operates.

FIG. 1 shows a layout diagram of an environment within which a preferred emergency portable radiotelephone (EPR) 10 operates. Although FIG. 1 shows only one EPR 10, any number of EPRs 10 may operate in this and other similar environments. Preferably, EPR 10 is configured as a portable unit which is easily carried from place to place. Thus, EPRs 10 freely move about within their environment.

EPR 10 operates in cooperation with conventional "A" and "B" cellular systems. System A includes a switching office 12 coupled to any number of cell site transceivers 14, hereinafter called base stations. Each of base stations 14 may engage in communications with cellular devices, such as EPR 10 and others, that reside in a cell 16 associated with it. System B includes a switching office 18 coupled to any number of base stations 20. Each of base stations 20 engages in communications with cellular devices, such as EPR 10 and others, that reside in a cell 22 associated with it.

System A and system B switching offices 12 and 18, respectively, each couple to the public switched telecommunications network (PSTN, not shown). Calls may be connected through a base station 14, switching office 12, and the PSTN to any phone number. Alternatively, calls may be connected through a base station 20, switching office 18, and the PSTN to any phone number. For purposes of the present invention, calls can be placed through either system A or system B to a party designated to receive "911" emergency calls.

Base stations 14 and their associated cells 16 cover diverse areas of geography. That way, system A may provide communication services throughout diverse geographical areas. Likewise, base stations 20 and their associated cells 22 cover diverse areas of geography so that system B may provide communication services to diverse geographical areas. Cells 16 and cells 22 may, and typically do, cover the same geographical areas. FIG. 1 illustrates only a minor overlap between cells 16 and 22 for clarity of illustration. However, those skilled in the art will appreciate that extensive overlap exists in most metropolitan areas. While extensive overlap between system A and system B cells typically exists, nothing in the present invention requires any overlap to be present, and systems A and B may both fail to cover some areas.

The overlapping arrangement between system A cells 16 and system B cells 22 results from FCC rules which are intended to encourage competition in the provision of cellular radiotelephone services. No interference between communications taking place in overlapping cells occurs because cellular systems A operate only on one set of frequencies, or channels, assigned by the FCC, and cellular systems B operate only on an entirely different set of channels.

Typically, cellular system A is provided by an entirely separate organization from that which provides cellular system B. In accordance with conventional cellular radiotelephony, cellular devices such as mobile and portable cellular radiotelephones, are subscribers to one of the A and B systems. These cellular devices are then programmed to prefer engaging in communications with the specific home system and system type (either A or B) to which they subscribe. This preference generally allows them to receive cheaper rates.

However, in the preferred embodiment of the present invention, nothing requires EPR 10 to subscribe to either an A cellular system or a B cellular system. Accordingly, when EPR 10 is capable of communicating over either an A cellular system or a B cellular system, EPR 10 uses a different decision process for selecting channels over which to communicate, as discussed below. Due to the absence of a requirement for EPR 10 to subscribe to any A or B cellular system, emergency communication services may be provided at less expense than conventional cellular services due to a lack of monthly subscription fees. Moreover, due to an improved cellular system selection process, improved communication services result.

Figure 2:
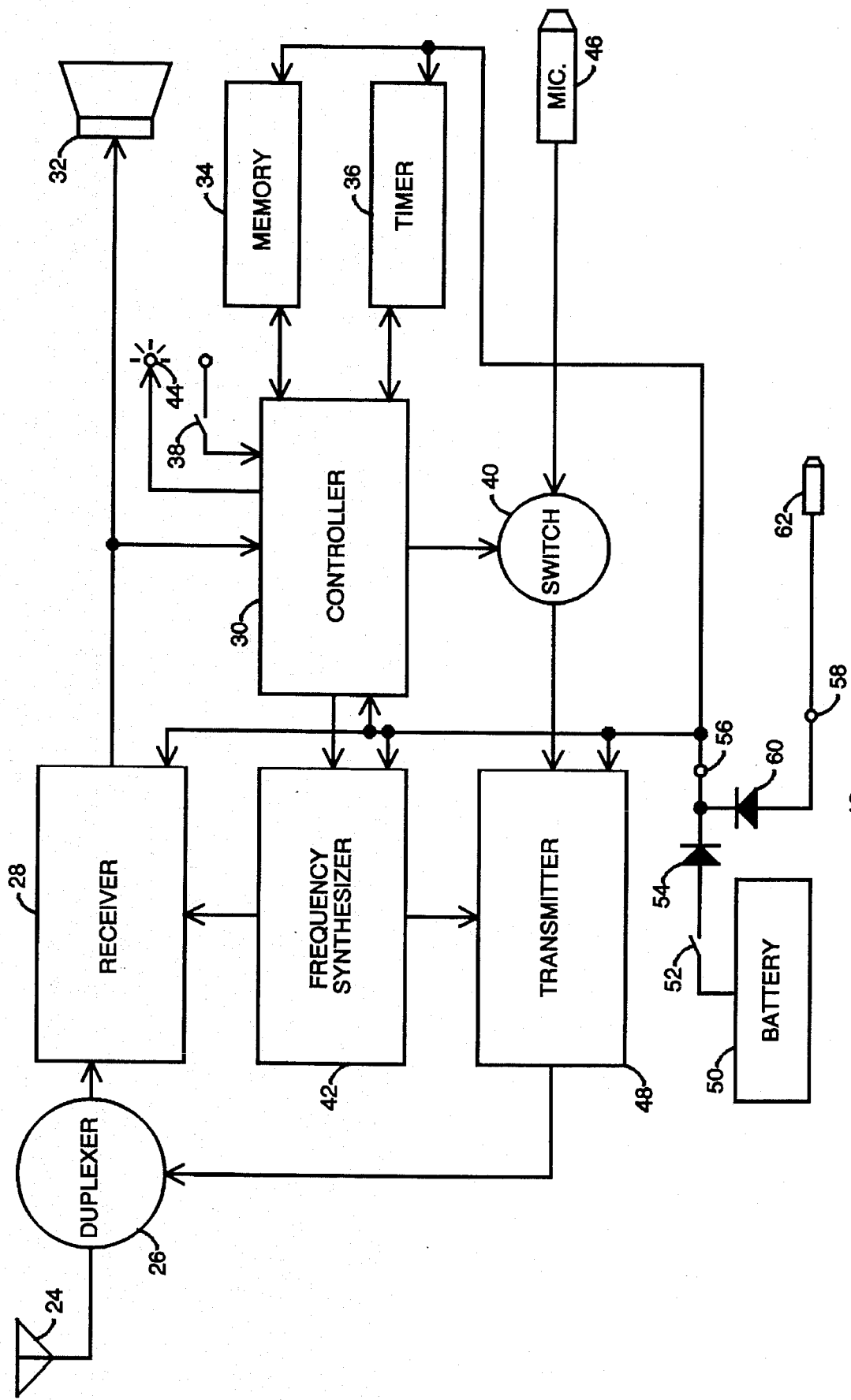
FIG. 2 shows a block diagram of the radiotelephone.

FIG. 2 shows a block diagram of a preferred EPR 10. EPR 10 includes an antenna 24 of a type conventionally used in connection with portable radio equipment. Antenna 24 couples to a first port of a duplexer 26. A second port of duplexer 26 couples to an input port of a receiver 28. An output port of receiver 28 couples to a controller 30 and a speaker 32. Controller 30 couples to a memory 34 and a timer 36. In addition, controller 30 receives user inputs from a control switch 38, and provides control outputs to a first input port of a transmission switch 40, a control input of a programmable frequency synthesizer 42, and an indicator 44, such as a light emitting diode or other conventional annunciator.

A microphone 46 couples to a second input port of transmission switch 40. An output port of switch 40 couples to an input port of a transmitter 48, and an output port of transmitter 48 couples to a third port of duplexer 26. Frequency synthesizer 42 provides local oscillator signals to receiver 28 and transmitter 48 under the control of commands received from controller 30. A battery 50 couples to a first node of a power switch 52. A second node of power switch 52 couples through a diode 54 to a power node 56, and an external power source connector 58 couples through a diode 60 to power node 56. External power may be supplied to EPR 10 through, for example, a vehicle's cigarette lighter by way of a cigarette lighter adapter 62. Power node 56 couples to all active components of EPR 10. Although not specifically illustrated in FIG. 2, EPR 10 may additionally include amplifiers, mute switches, tone decoders, tone generators, and other circuits conventionally included in cellular radiotelephones.

Received signals transmitted by a base station 14 or 20 (see FIG. 1) are converted to baseband by receiver 28. Controller 30 specifies the channels over which received signals are received and over which transmitted signals are transmitted through programming supplied to synthesizer 42. Received baseband data are supplied to controller 30 for processing therein, and received baseband audio is routed to speaker 32 for perception by a user of EPR 10. Controller 30 supplies baseband data through switch 40 and microphone 46 supplies baseband audio for transmission by transmitter 48.

Controller 30 may be implemented by a microprocessor and related circuits. Controller 30 uses timer 36 to help monitor real time. Memory 34 includes data which serve as instructions to controller 30 and which, when executed by controller 30, cause EPR 10 to carry out procedures that are discussed below. In addition, memory 34 includes variables, tables, and databases that are manipulated due to the operation of EPR 10.

Those skilled in the art will appreciate that the term switches used herein refers to any key, button, or the like, used to provide user inputs to controller 30. Control switches 38 represent all switches, other than power switch 52, which may be manipulated by a user to operate EPR 10 and are monitored by controller 30. Any number of control switches 38 may be included to provide user inputs to EPR 10. However, the preferred embodiment of EPR 10 includes only a single control switch 38. Thus, a user need only push the single control switch 38 to initiate an emergency call. Since only a single control switch 38 is used, the switch may be made physically large, compared to conventional portable cellular radiotelephone switches, for fast and easy manipulation by a user. In addition, the use of only one switch 38 frees a user, who may be facing an emergency situation with impaired vision, mental, or physical capacities, from discriminating multiple switches from one another, from knowing correct key press sequences required to effect a call, from misdialling, and the like.

Transmitter 48 is configured in cooperation with antenna 24 to provide output signals at a power level greater than 800 mw effective radiated power (ERP) and preferably closer to 1 watt ERP. This power level is greater than that used by conventional portable cellular radiotelephones. The power level is desirable to improve link margin between EPR 10 and base stations 14 and 20 (see FIG. 1). The increased power level corresponds to improved emergency communication services provided through EPR 10.

Power switch 52 serves only to control power supplied from battery 50. Thus, EPR 10 is energized whenever power switch 52 is activated or when external power is applied through connector 58 regardless of whether power switch 52 has been activated. Provision for two sources of power improves reliability because EPR 10 need not rely exclusively on a single power source. The minimal control of power further reduces the mental and physical manipulations required to make EPR 10 operational. Whenever an external power source is connected, such as inside a vehicle, EPR 10 is continually operational. Whenever an external power source is not connected, EPR 10 can be made operational by either connecting external power or switching on battery power, but both steps are not required.

Those skilled in the art will appreciate that EPR 10 as depicted in FIG. 2 represents a programmable transceiver which takes on a particular character assigned to it by software programming located in memory 34 and executed by controller 30. FIGS. 3-4 and 6-8, discussed below, present flow charts that describe such programming.

FIG. 3 shows a flow chart of an Energize procedure 64 performed by EPR 10. EPR 10 performs procedure 64 whenever it is first energized, whether by manipulation of switch 52 (see FIG. 2) or by the application of external power. Procedure 64 performs a task 66 to initialize EPR 10 and to perform internal tests. The initialization includes the deactivation of indicator 44 (see FIG. 2) and may include any other initialization tasks performed in connection with conventional cellular radiotelephones. The internal tests performed in task 66 are the sorts of tests performed in conventional cellular radiotelephones, except that the scope of such testing may desirably be reduced to reduce the length of time required for EPR 10 to become operational.

Figure 4:
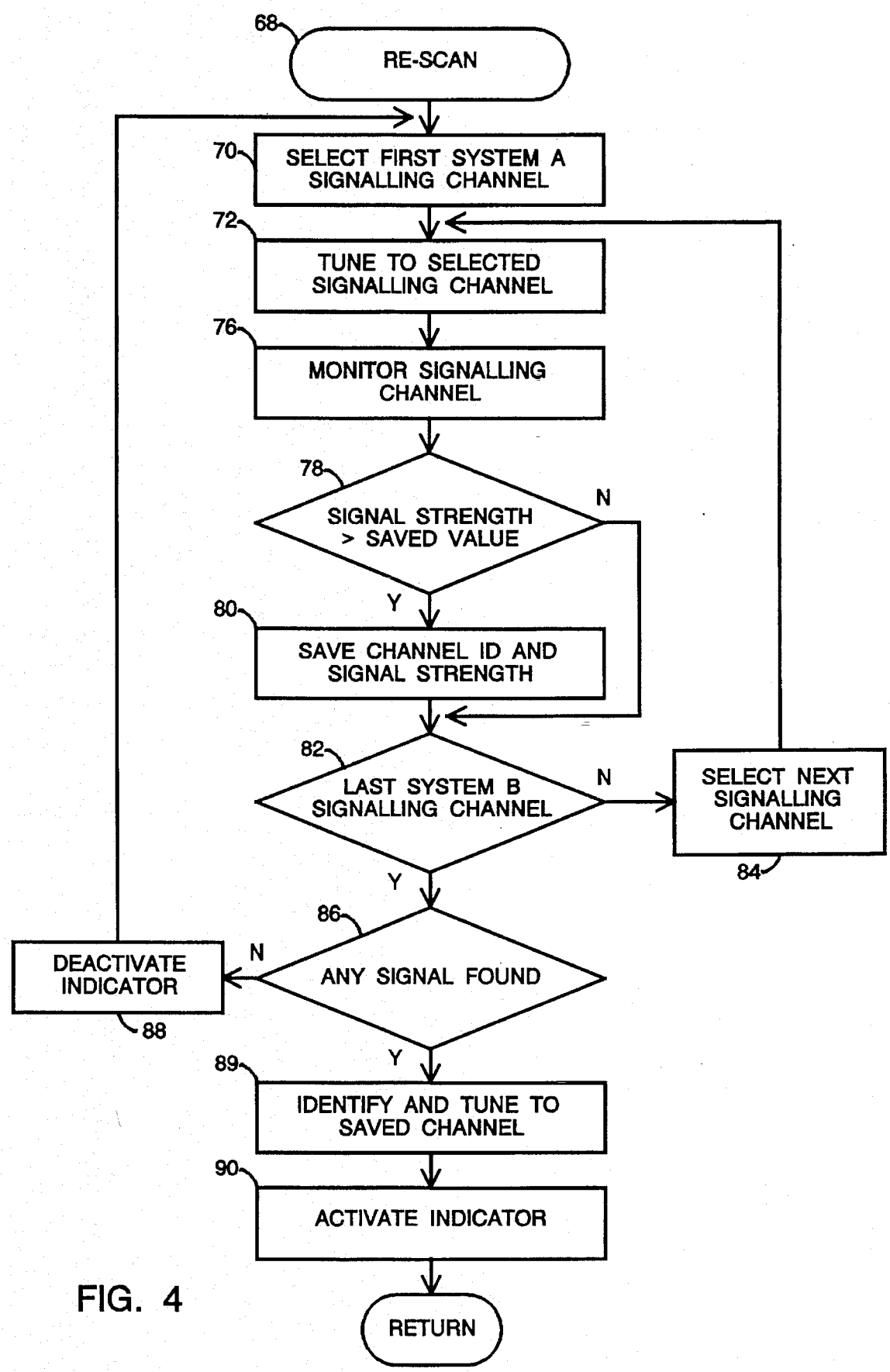
FIG. 4 shows a flow chart of a Re-scan routine performed by the radiotelephone.

After task 66, a task 68 causes EPR 10 to perform a Re-scan routine, hereinafter referred to as Re-scan routine 68. FIG. 4 shows a flow chart of Re-scan routine 68. Generally speaking, routine 68 operates as a programming loop which executes one time for each signalling channel potentially available to EPR 10. In accordance with current cellular system channel assignments, systems A (see FIG. 1) use up to twenty-one signalling channels, enumerated in the industry as channels 313–333 and systems B use up to twenty-one signalling channels, enumerated as channels 334–354. Thus, the currently preferred embodiment of routine 68 undergoes twenty one iterations related to system A and twenty-one iterations for system B for a total of forty-two iterations. After these forty-two iterations, the best available signalling channel is identified without regard to whether that best signalling channel is a system A channel or a system B channel.

In particular, a task 70 selects a first system A signalling channel. Task 70 may also clear a scan variable that EPR 10 uses to identify a signalling channel and a signal strength associated with the signalling channel. Task 70 may initialize a counter in selecting the signalling channel. Such a counter may, for example, be initialized to the value of zero, which could then be uniquely associated with channel number 313, the lowest system A signalling channel. After task 70, a task 72 tunes EPR 10 to the selected signalling channel. The tuning task may be performed by referring to a scan table 74, an exemplary block diagram of which is presented in FIG. 5.

As shown in FIG. 5, scan table 74 includes a list of tuning parameters that are used to program synthesizer 42 (see FIG. 2) so that EPR 10 may receive and transmit on the indicated channels. The scan table 74 illustrated in FIG. 5 additionally associates channel numbers and system identifiers with each set of tuning parameters. Such associations are optional and included in FIG. 5 only to illustrate the relationship between channel numbers, system types, and tuning parameters.

With reference back to FIG. 4, task 72 programs synthesizer 42 to tune EPR 10 to the selected channel, and task 72 then causes routine 68 to wait until synthesizer 42 has had time to slew to the indicated frequency and receiver 28 (see FIG. 2) has had time to lock onto any signal which may be present in a forward portion of the selected channel. Those skilled in the art will appreciate that the forward portion of a channel refers to frequencies used to transmit signals from base stations 14 and 20 (see FIG. 1) to EPR 10 and that a reverse portion of a channel refers to frequencies used to transmit signals from EPR 10 to base stations 14 and 20.

After task 72, a task 76 monitors the selected signalling channel. Task 76 causes controller 30 (see FIG. 2) to examine base band data generated by receiver 28 to determine if any signal is present and to determine the signal strength of any signal that may be present. Next, a query task 78 determines whether signal strength for the selected channel is greater than a signal strength value previously saved in the scan variable. The first time through the loop of Re-scan routine 68, task 78 indicates that the received signal strength is greater because the scan variable was initialized above in task 70.

When task 78 finds that the signal strength of the received signalling channel is greater than the signal strength indicated in the scan variable, a task 80 saves the channel ID for the currently selected signalling channel and the signal strength associated with it in the scan variable, replacing any previous data saved therein. After task 80 or when task 78 does not find a greater signal strength, routine 68 performs a query task 82. Task 82 determines whether the currently selected signalling channel is the last system B signalling channel. In other words, task 82 determines whether the signalling channel indicated at the bottom of the list saved in scan table 74 (see FIG. 5) has just been examined. So long as this last system B signalling channel has not yet been examined, a task 84 selects the next signalling channel by incrementing a counter or otherwise pointing to the next item in scan table 74. After task 84, program control loops back to task 72. Program control remains in the loop consisting of tasks 72, 76, 78, 80, 82, and 84 until all potentially available system A and system B signalling channels have been examined.

When task 82 determines that the last system B signalling channel has been examined, a query task 86 determines whether any acceptable signalling channel was found in the above-discussed loop. Task 86 may examine the scan variable to determine whether the signal strength value saved therein exceeds a predetermined minimum strength value. If no acceptable signal was found, a task 88 deactivates indicator 44 (see FIG. 2), and program control loops back to task 70. Those skilled in the art will appreciate that indicator 44 is deactivated at task 88 because procedures other than Energize procedure 64 (see FIG. 1) utilize Re-scan procedure 68, and these other procedures may invoke Re-scan procedure 68 with indicator 44 activated. Re-scan routine 68 will continue to scan all potential signalling channels until an acceptable signalling channel has been found.

When task 86 determines that the scan variable indicates a suitable signal strength, such signal strength is the greatest signal strength from all examined signalling channels due to the sorting operation achieved by the above-discussed programming loop. At this point, a task 89 identifies the signalling channel having the strongest signal by examining the scan variable for a channel ID, and task 89 tunes EPR 10 to the identified channel. This identified channel may be a system A channel or a system B channel. EPR 10 shows preference only for the signalling channel having the strongest signal.

When compared to conventional cellular radiotelephones, EPR 10 achieves improved communication services because it does not prefer a system A channel when a stronger system B channel is available, or vice-versa. Consequently, the best available signalling channel is selected for emergency communication services. This best available signalling channel offers the best chance of successfully establishing a communication link to an emergency phone number, and this best channel is associated with voice channels that, in all likelihood, will provide the best quality audio between EPR 10 and the emergency phone number. The best chance of successfully establishing a communication link is desirable in emergency situations where high reliability and dependability are important. The best quality audio is desirable in emergency situations because misunderstood communications may lead to disastrous consequences.

After task 89 tunes EPR 10 to the identified best signalling channel, a task 90 activates indicator 44 to provide the user with information indicating the availability of emergency communication services, then program control returns to the procedure from which routine 68 was called.

Referring back to FIG. 3, after performing Re-scan routine 68, program control proceeds to Idle procedure 92. FIG. 6 shows a flow chart of Idle procedure 92. Generally speaking, procedure 92 causes EPR 10 to perform background tasks is a loop while waiting for a user to indicate that emergency communication services are desired.

In contrast to conventional cellular radiotelephony, EPR 10 refrains from performing an autonomous registration process. Thus, the cellular system A or B to which EPR 10 is now tuned does not know that EPR 10 exists, and EPR 10 may be considered an unregistered roamer on this system. Procedure 92 performs an optional query task 94 to determine whether a roamer identify message has been received from the signalling channel to which EPR 10 is tuned. Such messages are sent by a base station 14 or 20 so that the cellular system may identify roamers in its domain and route incoming calls to such roamers. If a roamer identify message is received, an optional task 96 may be performed to ignore the message. Thus, the system continues not to know that EPR 10 exists, and EPR 10 will be prevented from receiving incoming calls.

After task 96 or when task 94 determines that no roamer identify message has been received, a query task 98 determines whether control switch 38 (see FIG. 2) has been activated. A user may manipulate or activate switch 38 when the user wishes emergency communication services. When activation of a control switch is detected in task 98, program control proceeds to Establish Call procedure 100, discussed below in connection with FIG. 7.

When task 98 determines that no control switch has been activated, a query task 102 determines whether Re-scan routine 68 (see FIG. 4) should be performed at the current instant in time. Preferably, Re-scan routine 68 is repeated periodically so that the signalling channel to which EPR 10 is tuned tracks the best available signalling channel in spite of EPR 10 movement or other factors. Preferably, EPR 10 examines signalling channels more frequently than conventional cellular radiotelephones. Preferably, task 102 causes EPR 10 to re-scan the signalling channels more frequently than once every three minutes, and more preferably around once every two minutes.

When task 102 determines that it is not time to re-scan the signalling channels, program control loops back to task 94. When task 102 determines that it is time to re-scan the signalling channels, Re-scan routine 68 (see FIG. 4) is performed, then program control loops back to task 94. As a result of performing Re-scan routine 68 within Idle procedure 92, the cellular system to which EPR 10 is tuned may change from system A to system B, or vice-versa, and the signalling channel to which EPR 10 is tuned may change whether or not EPR 10 is tuned to a different cellular system. After performing Re-scan routine 68, program control loops back to task 94. Program control remains in Idle procedure 92 until a user indicates that he or she wishes to establish a call or until power is removed.

Figure 7:
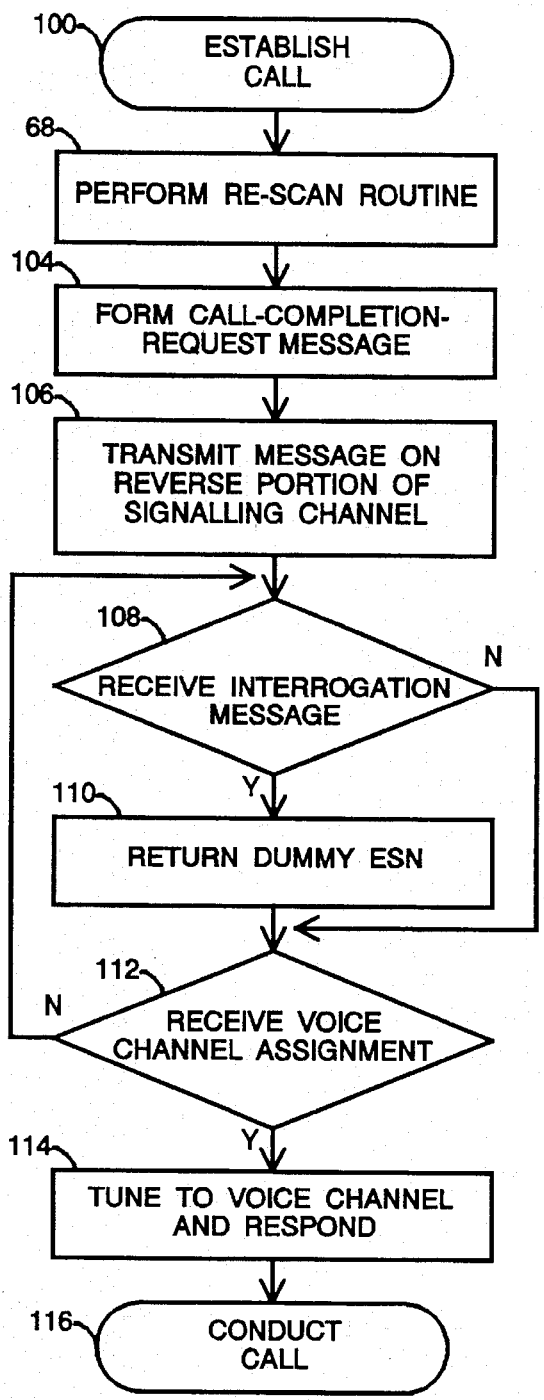
FIG. 7 shows a flow chart of an Establish Call procedure performed by the radiotelephone.

FIG. 7 shows a flow chart of tasks performed by EPR 10 in Establish Call procedure 100. Generally speaking, procedure 100 initiates communication with an A or B cellular system through a base station 14 or 20, respectively, (see FIG. 1) and requests the cellular system to setup a call to the party or organization responsible for receiving "911" emergency calls in the geographic area where the cellular system offers radio telecommunication services.

Procedure 100 initially performs Re-scan routine 68 (see FIG. 4) so that the best available signalling channel may be determined at the instant that the call is to be placed. Of course, it is desirable that emergency communication services be established as quickly as possible due to the presence of a potential emergency situation. In the preferred embodiments of the present invention, the delay imposed by performing routine 68 is less than one second, which is easily tolerated when a possible benefit of finding a better signalling channel is considered.

After performing routine 68, procedure 100 performs a task 104 to form a call-completion-request message. Such messages are interpreted by a cellular system as a command to initiate the call setup process. The call-completion-request message includes at least three distinct items of data. A first item informs the cellular system that the message is a call-completion-request message. A second item informs the cellular system of the phone number of the called party, and a third item informs the cellular system of the identity or phone number of the calling party. Task 104 uses a predetermined constant for the first item of data. The second item of data is encoded to include the digits of an emergency phone number, preferably as "9-1-1". The third item of data is encoded to include a mobile identification number (MIN) for EPR 10.

Since EPR 10 is prevented from receiving incoming calls, EPR 10 has no need for a MIN, other than to satisfy the requirements of cellular systems and to provide a unique identification which cellular systems may transpond back for recognition by EPR 10. Accordingly, task 104 forms the call-completion-request message to include an invalid, and preferably unique, MIN. Cellular systems require MINs in the form of ten digit, NPA-NNX-XXXX codes used in telephony, where "NPA" represents the three digit numbering plan area or area code, "NNX" represents a three digit central office code, and "XXXX" represents a four digit number. Task 104 formats the MIN for EPR 10 as an invalid MIN by including an improper NPA number, such as an NPA number that has zero as the first digit, an improper NNX number, or the like. Preferably, in a population of EPRs 10, no two EPRs 10 have the same MIN. Thus, task 104 may format the NPA portion of the MIN to have zero as a first digit, and the remaining nine digits of the MIN may contain a unique number programmed into each EPR 10.

After task 104, a task 106 transmits the call-completion-request message to a base station 14 or 20 (see FIG. 1) over the reverse portion of the signalling channel. When this message is received by the base station 14 or 20, it is examined and found to contain a request for connecting a call to the "911" emergency number, which is a unique emergency number that is given special treatment. In particular, organizations that operate A and B cellular systems operate under licenses from the FCC which require them to provide free "911" service to the public. Consequently, the normal checks and verifications that may be performed in accordance with other requests for calls are omitted in connection with "911" calls, and such calls are quickly connected.

The base station 14 or 20 receiving a "911" connect call request from EPR 10 may, but typically does not, request EPR 10 to supply additional identification. Such a request is made by transmitting a message over the signalling channel to which EPR 10 is tuned, and the transmitted message includes the EPR's MIN. Thus, after EPR 10 performs task 106, a query task 108 is performed to determine whether EPR 10 has received an interrogation message from the cellular system to which it is tuned. If it receives such a message, a task 110 is performed to return an invalid or dummy electronic serial number (ESN) to the system making the request. The ESN may, for example, include zero as the first byte of the ESN and any other combination of digits following this zero. Those skilled in the art will appreciate that the use of invalid MIN and ESN numbers is not harmful to cellular systems and organizations which operate cellular systems because no charges are assessed for "911" calls and no incoming calls are received at EPR 10.

After task 110 or when task 108 fails to detect an interrogation message from the cellular system, a query task 112 determines whether a message has been received which assigns a voice channel to EPR 10. If the voice channel assignment has not yet been received, program control loops back to task 108. Program control remains in a loop that includes tasks 108, 112, and possibly 110 until the voice channel assignment is received. However, those skilled in the art will appreciate that conventional tests for timeouts and the like may be performed in this loop.

When task 112 eventually detects a message from the A or B cellular system assigning a voice channel, a task 114 tunes to the assigned voice channel and transmits an appropriate response to the cellular system. EPR 10 is now ready to conduct a call with the emergency phone number, and program control proceeds to a Conduct Call procedure 116.

Figure 8:
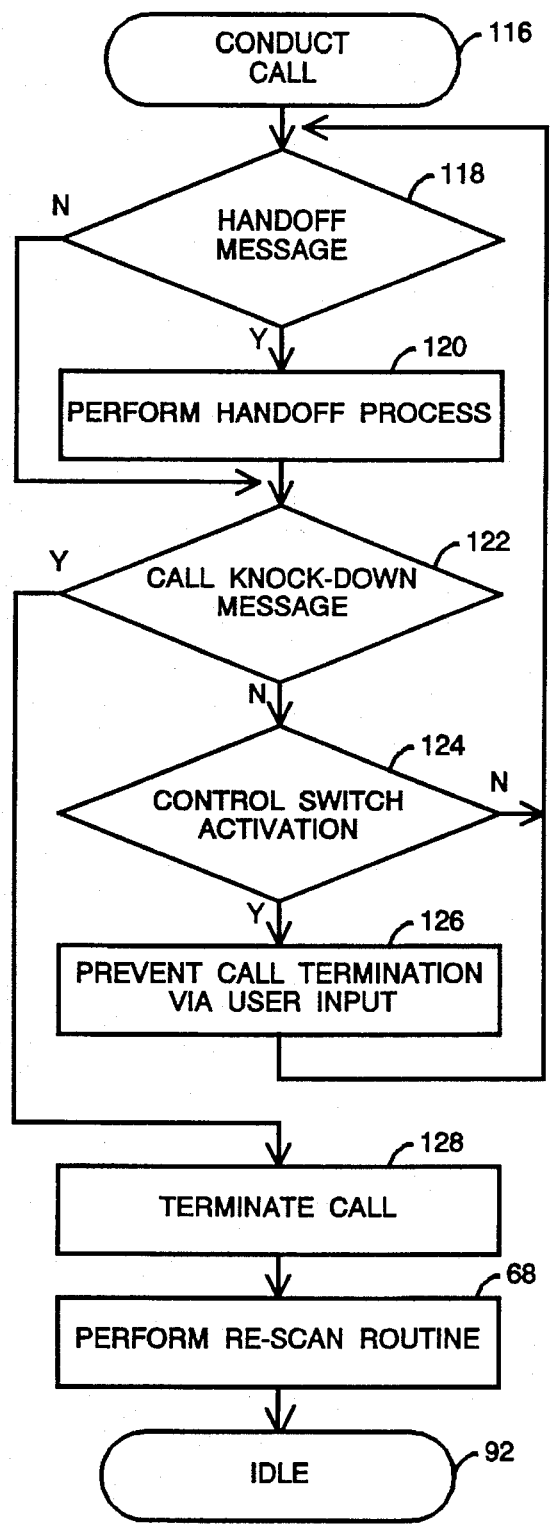
FIG. 8 shows a flow chart of a Conduct Call procedure performed by the radiotelephone.

FIG. 8 shows a flow chart of Conduct Call procedure 116. Generally speaking, procedure 116 is performed to manage the call through call termination. Accordingly, procedure 116 performs a query task 118 to determine whether a handoff message has been received from the cellular system through which EPR 10 is communicating. If a handoff message is received, EPR 10 performs a handoff process 120, which includes tasks conventionally performed by cellular radiotelephones to handle handoffs.

After process 120 or when task 118 determines that no handoff message has been received, a query task 122 determines whether a call knock-down message has been received from the cellular system through which EPR 10 is communicating. A knock-down message occurs when the called party terminates a call. When a knock-down message is not detected, procedure 116 performs an optional query task 124 to determine whether any control switch 38 has been activated or otherwise manipulated. If such an activation or manipulation is detected, an optional task 126 prevents call termination from taking place as a result of such manipulation. In other words, the emergency call continues regardless of any hanging-up or other actions attempted by the user of EPR 10, short of removing power from EPR 10. After task 126, program control loops back to task 118 to continue conducting the call.

The prevention of call termination at EPR 10, other than by de-energization, enhances emergency communication services. In certain emergency situations, disastrous consequences may result from accidently hanging up a call or otherwise terminating the call early. Additional information, such as user location or an indication of the seriousness of the situation, may be obtained by continuing the call as long as possible. Accordingly, procedure 116 continues to maintain the call in progress until the called party terminates the call or until power is removed from EPR 10.

When task 122 eventually encounters a knock-down message, a task 128 terminates the call by ceasing transmissions on the currently assigned voice channel. Next, Re-scan routine 68 (see FIG. 4) is again performed to select the best available signalling channel, and program control then returns to Idle procedure 92 (see FIG. 6).

In summary, the present invention provides an improved emergency cellular radiotelephone. The emergency cellular radiotelephone selects the A or B cellular system which offers the best signal without preference toward whether that cellular system is an A system or a B system. The emergency cellular radiotelephone is configured as a portable unit for easy access in emergency situations. As a portable unit, the emergency cellular radiotelephone transmits at a high power level to improve communication reliability and quality. The emergency cellular radiotelephone is configured for quick and easy operation so that emergency calls may be successfully completed in spite of reduced visual, mental, or physical capacities that may be present in an emergency situation. Moreover the emergency cellular radiotelephone may be manufactured at relatively little expense due to the omission of switches and other components commonly included on cellular radiotelephones. And, the emergency cellular radiotelephone may be provided to the general population at relatively little expense due to the low manufacturing expense and the lack of a need for cellular subscription fees.

The present invention has been described above with reference to preferred embodiments. However, those skilled in the art will recognize that changes and modifications may be made in these preferred embodiments without departing from the scope of the present invention. For example, those skilled in the art will understand that a timer may be implemented in a controller rather than in separate components. Likewise, a re-scan routine may scan signalling channels in other orders than described herein. In addition, the teaching of the present invention is not limited to use in portable cellular radiotelephones, but may be implemented in stationary, roadside, or mobile cellular radiotelephones as well. Furthermore, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from unit to unit. These and other changes and modifications which are obvious to those skilled in the art are intended to be included within the scope of the present invention.

What is claimed is:

1. A method of operating an emergency cellular radiotelephone in cooperation with a cellular telecommunication network having A and B cellular systems, said A and B systems each having a plurality of signalling channels assigned thereto, and said method comprising the steps of:

receiving, at said radiotelephone, signalling channels assigned to said system A;

receiving, at said radiotelephone, signalling channels assigned to said system B;

identifying, at said radiotelephone after said receiving steps, the one of said system A and system B signalling channels which has a signal with the greatest signal strength; and communicating, in response to said identifying step, between said radiotelephone and the one of said A and B systems which has said identified one of said channels assigned thereto.

2. A method of operating an emergency cellular radiotelephone as claimed in claim 1 wherein:

said radiotelephone has at least N switched and a controller which monitors N of said switches, where N is an integer number; and said method comprises, after said communicating step, the step of conducting a call with an emergency number, said establishing step being configured to prevent the termination of said call through the manipulation of any of said N switches.

3. A method of operating an emergency cellular radiotelephone as claimed in claim 1 additionally comprising the step of periodically repeating said receiving steps and said identifying step.

4. A method of operating an emergency cellular radiotelephone as claimed in claim 3 wherein said periodically repeating step is configured to repeat said receiving steps and said identifying step at intervals of less than three minutes.

5. A method of operating an emergency cellular radiotelephone as claimed in claim 1 additionally comprising the step of activating an indicator when said identifying step identifies said one of said channels.

6. A method of operating an emergency cellular radiotelephone as claimed in claim 1 additionally comprising the steps of:

detecting, after said identifying step, a manipulation of a switch; and transmitting a message over a reverse portion of said one channel requesting completion of a call to a called party in response to said detecting step, said message being encoded to include the digits "911" as an identity for said called party.

7. A method of operating an emergency cellular radiotelephone as claimed in claim 6 additionally comprising the step of repeating said receiving steps and said identifying step between said detecting and transmitting steps.

8. A method of operating an emergency cellular radiotelephone as claimed in claim 6 wherein said transmitting step comprises the step of encoding said message to include a mobile identification number (MIN) for said emergency phone, said MIN being configured in a 10 digit, NPA-NNX-XXXX format as an invalid phone number.

9. A method of operating an emergency cellular radiotelephone as claimed in claim 8 wherein said encoding step comprises the step of assigning a first digit portion of said NPA portion of said MIN to equal zero.

10. A method of operating an emergency cellular radiotelephone as claimed in claim 1 wherein said emergency cellular radiotelephone is configured as a portable cellular phone and said communicating step comprises the step of transmitting at an effective radiated power of greater than 800 mw.

11. A method of operating an emergency cellular radiotelephone as claimed in claim 1 wherein:

said emergency cellular radiotelephone is configured as a portable cellular phone having a power switch; and said method comprises the step of energizing said portable cellular phone from a battery when said power switch is activated or from an external power source regardless of whether said power switch is activated.

12. A method of operating an emergency cellular radiotelephone as claimed in claim 1 additionally comprising the step of preventing the receipt of incoming calls.

13. An emergency cellular radiotelephone configured for cooperative operation with a cellular telecommunication network having A and B cellular systems, said A and B systems each having a plurality of signalling channels assigned therto, said radiotelephone comprising:

means for monitoring said system A signalling channels and said system B signalling channels;

means, coupled to said monitoring means, for identifying the one of said system A and system B signalling channels which has a signal strength greater than the signal strength for any other of said system A and system B signalling channels when both system A signalling channels and system B signalling channels are received at said radiotelephone; and means, coupled to said identifying means, for establishing a call through the one of said A and B cellular systems which has said identified one of said signalling channels assigned thereto.

14. An emergency cellular radiotelephone as claimed in claim 13 wherein:

said monitoring means is configured to monitor all signalling channels assigned to said A and B cellular systems; and said identifying means is configured to select said one signalling channel from all channels monitored by said monitoring means.

15. An emergency cellular radiotelephone as claimed in claim 13 wherein said call is placed to a called party, and said radiotelephone additionally comprises:

a power source configured to supply electrical power to said radiotelephone; and means, coupled to said power source and said establishing means, for continuing said call until said call is terminated, said continuing means being configured to allow call termination only upon removal of said electrical power or upon a termination instigated by said called party.

16. An emergency cellular radiotelephone as claimed in claim 13 additionally comprising means, coupled to said identifying means, for preventing the receipt of incoming calls.

17. An emergency cellular radiotelephone as claimed in claim 13 wherein:

said radiotelephone additionally comprises a switch configured in cooperation with said establishing means so that said establishing means is responsive to activation of said switch; and said establishing means comprises message formation means for forming a message to be sent over a reverse portion of said one of said signalling channels, said message requesting completion of said call to a called party, and said message being encoded to automatically include the digits "911" as an identity for said called party.

18. An emergency cellular radiotelephone as claimed in claim 17 wherein said message formation means is configured to include a mobile identification number (MIN) for said emergency phone, said MIN being configured in a 10 digit, NPA-NNX-XXXX format as an invalid phone number.

19. An emergency cellular radiotelephone as claimed in claim 18 wherein said message formation means is further configured to assign a first digit portion of said NPA portion of said MIN to equal zero.

20. An emergency cellular radiotelephone as claimed in claim 13 additionally comprising:

a battery;

a power switch having a first node coupled to said battery and a second node coupled to said monitoring means, said identifying means, and said establishing means; and external power supply means coupled to said second node of said power switch so that said monitoring means, identifying means, and establishing means can be energized through said external power supply means regardless of whether said power switch is activated.

21. A method of operating a portable emergency cellular radiotelephone in an environment having at least one of A and B cellular systems, said A and B systems each having a plurality of base stations wherein each system A base station broadcasts a signal over a forward portion of a signalling channel associated with said system A and wherein each system B base station broadcasts a signal over a forward portion of a signalling channel associated with said system B, wherein said radiotelephone has a battery, a power switch, and a control switch, and said method comprises the steps of:

energizing said portable cellular phone from said battery when said power switch is activated;

energizing said portable cellular phone from an external power source regardless of whether said power switch is activated;

monitoring signalling channels used by said system A base stations;

monitoring signalling channels used by said system B base stations;

identifying, after said monitoring steps, the one of said system A and system B signalling channels which has a signal with the greatest signal strength;

detecting a manipulation of said control switch;

sending a message over a reverse portion of said one of said system A and system B signalling channels requesting completion of a call to a called party in response to said detecting step, said message being encoded to include the digits "911" as an identity for said called party; and conducting a call with said called party, said conducting step being configured to allow call termination only upon de-engerization of said portable cellular phone or upon a termination instigated by said called party.

22. A method of operating a portable emergency cellular radiotelephone as claimed in claim 21 wherein said sending step comprises the step of encoding said message to include a mobile identification number (MIN) for said portable emergency phone, said MIN being configured in a 10 digit, NPA-NNX-XXXX format with a first digit portion of said NPA portion of said MIN equaling zero.

* * * * *